(12) United States Patent
Werz

(10) Patent No.: US 7,025,589 B2
(45) Date of Patent: Apr. 11, 2006

(54) WOOD BURNING OVEN

(76) Inventor: Karl-Otto Werz, Staeffeleswiesen 28, D-89522 Heidenheim (DE)

( * ) Notice: Subject to any disclaimer, the term of this patent is extended or adjusted under 35 U.S.C. 154(b) by 114 days.

(21) Appl. No.: 10/728,280

(22) Filed: Dec. 3, 2003

(65) Prior Publication Data

US 2004/0139958 A1    Jul. 22, 2004

(30) Foreign Application Priority Data

Dec. 4, 2002   (DE) ................................ 102 56 585

(51) Int. Cl.
*F23D 14/12*   (2006.01)

(52) U.S. Cl. ..................................... 431/328; 126/21 R

(58) Field of Classification Search .............. 126/21 R, 126/21 A, 67; 431/328; 219/400
See application file for complete search history.

(56) References Cited

U.S. PATENT DOCUMENTS

| | | | | |
|---|---|---|---|---|
| 1,243,606 | A | * 10/1917 | Holley | .......................... 258/6 |
| 4,095,586 | A |   6/1978 | Selva | |
| 4,124,016 | A | * 11/1978 | Miller | ....................... 126/21 A |
| 5,129,384 | A | *  7/1992 | Parks | ....................... 126/21 A |

FOREIGN PATENT DOCUMENTS

| | | |
|---|---|---|
| DE | 37 20 819 | 4/1989 |
| DE | 40 10 203 | 12/1994 |
| DE | 102 56 585 B3 | 7/2004 |

* cited by examiner

*Primary Examiner*—Alfred Basichas
(74) *Attorney, Agent, or Firm*—M. K. Silverman; Yi Li

(57) ABSTRACT

A wood-burning oven is provided with a plurality of baking chambers arranged one above the other, a combustion region and a flue-gas guidance, it being possible for the individual baking chambers to be closed off in relation to the flue-gas guidance by pivotable baking-chamber flaps. Flue-gas-duct flaps are arranged in the flue-gas guidance so as to produce a meandering flue-gas guidance when the flue-gas-duct flaps and at least some of the baking-chamber flaps are closed.

11 Claims, 2 Drawing Sheets

WOOD BURNING OVEN

Figure 1:
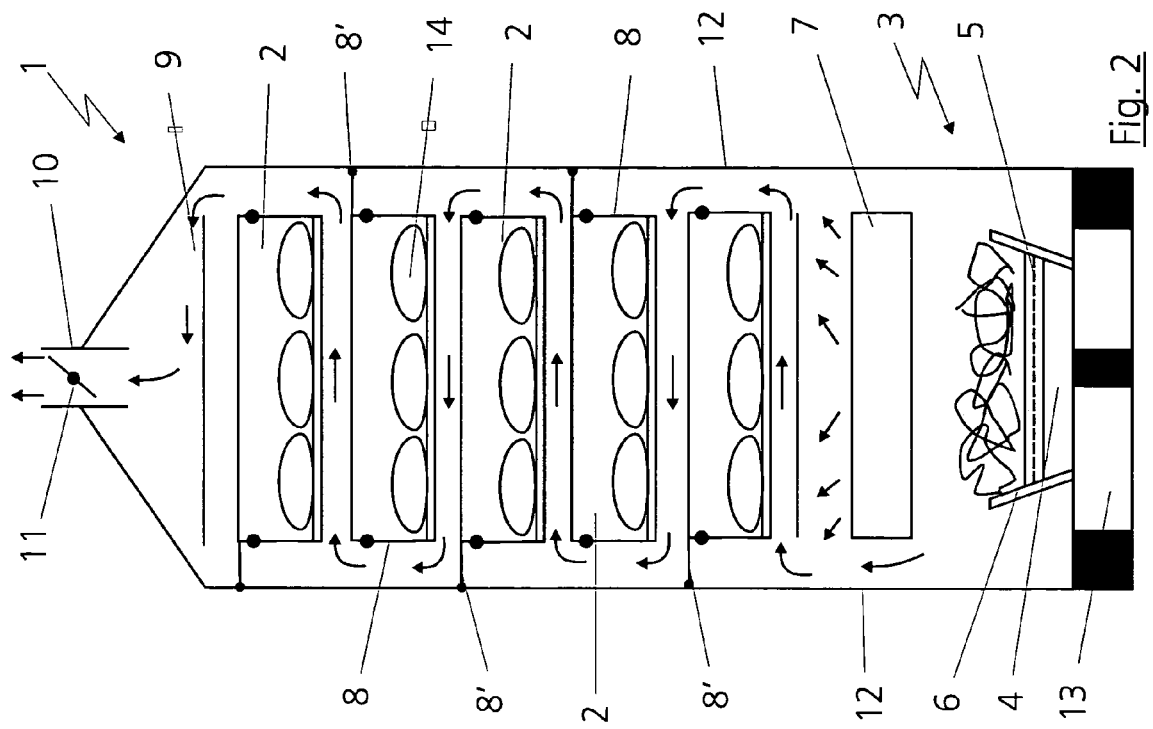

The invention relates to a wood-burning oven having a plurality of baking chambers arranged one above the other, a combustion region and a flue-gas guidance, it being possible for the individual baking chambers to be closed off in relation to the flue-gas guidance by means of pivotable baking-chamber flaps.

DE 37 20 819 A1 discloses a baking unit of transportable configuration. The baking unit is provided with a plurality of baking chambers which are arranged one above the other and can be heated on the inside, the baking chambers being provided with adjustable flaps. The baking chambers have floors and, in the front region, these floors constitute lift-out panels through which the embers located in one chamber can drop into the next chamber beneath. Upon ash removal, the ash can be delivered into the ash box located therebeneath. Arranged beneath the baking chambers is a fan, from which a plurality of risers extend up to the height of two chambers located at the same height.

This baking unit has a critical disadvantage, namely that the baking-chamber floors, in order to be prepared for baking purposes, have to be provided individually with combustion material in order thus to maintain a suitable baking temperature. For this reason, the ash in the individual baking chambers has to be removed prior to the baking operation, which considerably increases the time taken for preparing the oven.

Also known are wood-burning ovens which constitute directly heated ovens, as are known from U.S. Pat. No. 4,095,586 A, in which, in the baking chamber, the fire heats up the refractory lining and the bricks, in order to pass on this heat at a later stage to the articles which are to be baked. This configuration of a wood-burning oven has a very high energy consumption and is thus harmful to the environment.

DE 40 10 203 C2 discloses an oven which has two baking chambers arranged one beside the other in one plane. In addition to heating the baking chambers, it is also possible to heat a combustion chamber. During firing of the baking chambers, slides are adjusted so as to release vents in the vicinity of baking-chamber floors. In the operating state, it being possible for fire to be ignited in the combustion chamber, a flue-gas guidance is guided symmetrically to the two sides of the baking chambers. The slides are thus closed in relation to the baking chambers, with the result that flue gases are guided around the baking chambers.

Accordingly, it is an object of the invention to provide an oven of the type mentioned in the introduction which has optimum conditions in respect of the heat absorbed by the fuels which are to be burnt and the heat passed on to the articles which are to be baked, optimum utilization of the thermal energy being possible.

This object is achieved according to the invention in that flue-gas-duct flaps are arranged in the flue-gas guidance so as to produce a meandering flue-gas guidance when the flue-gas-duct flaps and at least some of the baking-chamber flaps are closed.

Baking-chamber flaps are located to the sides of the baking chambers in each case, as a result of which the flue gases can flow through when the oven is heated up, and thus heat the baking chambers directly. A flue-gas guidance is likewise located between the baking chambers and the lateral walls, it being possible for flue gases to escape above the baking chambers. The flue-gas guidance contains flue-gas-duct flaps, which are introduced into the flue-gas guidance so as to produce a serpentine (meandering) flue-gas guidance when the flue-gas-duct flaps and at least some of the baking-chamber flaps are closed. The flue-gas-duct flaps regulate the flue gases and thus make expedient use of the heating energy. Furthermore, the system of flaps and flue-gas guidance makes it possible for the heat of the fuel embers to be utilized further during baking in order to maintain the baking temperature.

Figure 2:
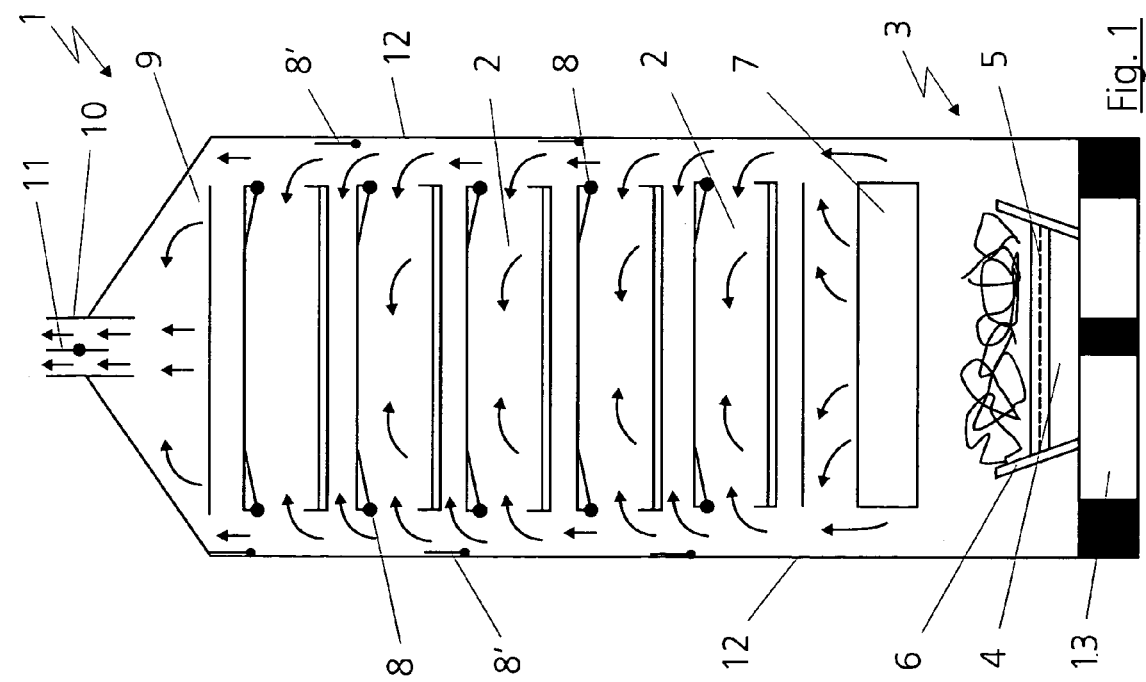
Figure 3A:
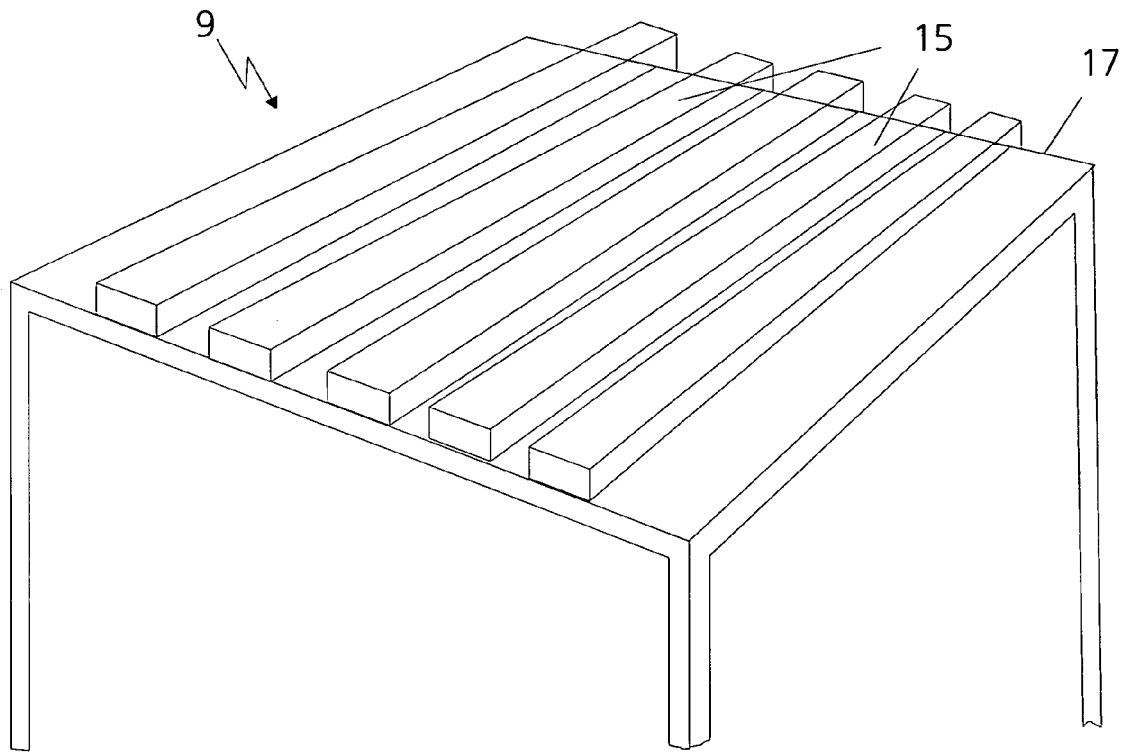

Advantageous embodiments and developments of the invention can be gathered from the rest of the subclaims and from the exemplary embodiment which is described in principle hereinbelow with reference to the drawing, in which:

FIG. 1 shows an illustration of a wood-burning oven according to the invention as it is heated up, FIG. 2 shows an illustration of the wood-burning oven presented in FIG. 1 during the baking operation, and FIG. 3 shows an illustration of a steaming arrangement.

FIG. 1 gives an illustration of a wood-burning oven 1 or also called wood-baking oven 1 as it is heated up. The wood-burning oven 1 comprises a metal structure, in particular made of black plate. Furthermore, the wood-burning oven 1 contains a plurality of baking chambers 2 arranged one above the other, these baking chambers being arranged above a combustion region 3. The combustion region 3 comprises an ash chamber 4, a grate 5 and a firing carriage 6. The firing carriage 6 here is advantageously configured such that it can be pulled out. It is possible here for the wood-burning oven 1 to be fired using a wide range of different types of wood, such as spruce, beech, birch, poplar or bamboo. It would also be possible, however, to use briquettes for firing purposes. At least one fireclay brick 7 is arranged above the combustion region 3 and serves for storing heat. Flue gases from the combustion chamber 3 can pass, to the sides of the fireclay brick 7, to the baking chambers 2, which are mounted above the fireclay brick 7 in the wood-burning oven 1. Provided on floors of the baking chambers 2 are stone tiles (not illustrated in this exemplary embodiment) for accommodating articles 14 which are to be baked. Baking-chamber flaps 8, which are of pivotable configuration, are located in each case on side walls 12 of the baking chambers 2. Flue-gas-duct flaps 8', which serve for improved flue-gas guidance, are also located on the side walls 12 of the wood-burning oven 1, in each case between the baking-chamber flaps 8 of the baking chambers 2. As the wood-burning oven 1 is heated up, the flue gases can pass directly to the baking chambers 2 from the combustion chamber 3, the baking-chamber flaps 8 being open in order for the interior of the baking chambers 2 to be heated up to better effect. The flue-gas-duct flaps 8' in the flue-gas guidance are likewise open, in order that the flue gas can access each baking chamber 2. A steaming arrangement 9 is provided above the baking chambers 2, and this is described in more detail hereinbelow with reference to FIG. 3. Furthermore, a flue-gas discharge 10 is located above the steaming arrangement 9, the flue-gas discharge 10 containing a waste gas flap 11, which is open for the discharge of flue gas into the environment as the wood-burning oven 1 is heated up.

An insulating layer is located in each case on the side walls 12 of the wood-burning oven 1, this layer not being illustrated in the schematic illustration of the wood-burning oven 1 in FIG. 1. The at least one fireclay brick 7, the stone tiles on the floors of the baking chambers 2 and the insulation can thus absorb to very good effect the heat emanating from the combustion chamber 3, as the wood-burning oven 1 is heated up, and store it over a relatively long period of time.

In this examplary embodiment, the wood-burning oven 1 is mounted on a pallet 13, it likewise being possible for the wood-burning oven 1 to be set down without a pallet 13 or to be provided with rollers for easier movement.

The wood-burning oven 1 which is shown in FIG. 1 is illustrated in FIG. 2 during the baking operation. The wood-burning oven 1 here has reached the desired temperature for the baking operation, in order thus for the baking chambers 2 to be charged with the articles 14 which are to be baked. The wood-burning oven 1 in this exemplary embodiment is not subsequently heated in the combustion region 3. It would easily be possible, however, for the wood-burning oven 1 to be subsequently heated. In order to maintain the temperature for baking the articles 14 which are to be baked, the baking-chamber flaps 8 and the flue-gas-duct flaps 8' are closed. It is thus then possible for the flue gas to pass from the combustion chamber 3, along the at least one fireclay brick 7, in a meandering flue-gas guidance along the baking chambers 2 to the flue-gas discharge 10. In this case, the waste-gas flap 11 is closed to the extent where only some of the flue gas can still escape. As a result of the flaps and the flue-gas-guidance system, the heat of the wood embers in the combustion chamber 3 can be further utilized during baking in order thus to maintain the temperature for baking the articles 14 which are to be baked, without subsequent firing being required. It is thus possible, depending on the necessary temperature, for articles 14 to be baked one after the other.

For the purposes of closing and opening the flue-gas-duct flaps 8' and the baking-chamber flaps 8, lever elements are provided on a front side of the wood-burning oven 1. The lever elements for the flaps 8 and 8' may be configured in accordance with the conventional prior art.

By virtue of the large storage mass in conventional wood-burning ovens being done away with, the wood-burning oven 1 requires only a very small quantity of heating material and thus also utilizes the flue gases to good effect, which is manifested, in low levels of odour and harm to the environment, as a great advantage over the systems which are known from the prior art.

Figure 3B:
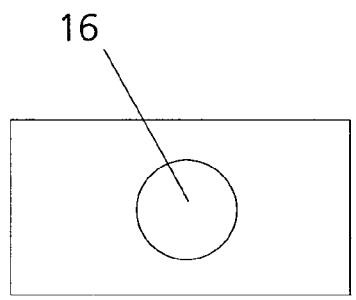

FIG. 3 shows the steaming arrangement 9; for reasons of clarity, the flue-gas discharge 10 has not been included in the illustration. The steaming arrangement 9 comprises a plurality of steam-feeding pipes 15 arranged above the baking chambers 2. The steam-feeding pipes 15 are arranged parallel to the side walls 12 of the wood-burning oven 1. Furthermore, the steam-feeding pipes 15 in this exemplary embodiment are designed as quadrilateral pipes, cross-sectionally round openings 16 being utilized, as can be seen in FIG. 3b, for conducting water and/or steam. The steam-feeding pipes 15 each lead, on a rear side 17 of the wood-burning oven 1, to the respective baking chambers 2. The introduction of steam into the baking chambers 2 allows the articles 14 to be baked to a particularly golden-brown and crispy state. It should be noted here that in each case just one steam-feeding pipe 15 is connected to a baking chamber 2.

For baking relatively largely quantities of articles 14, it would be possible to utilize a plurality of such wood-burning ovens 1, it also being possible for the latter to be positioned in a row one beside the other. It is likewise possible for the wood-burning oven 1, as a result of the insulation on all sides, to be positioned in abutment, which results in very favourable utilization of positioning surfaces.

The wood-burning oven 1 according to the invention does not require any electrical energy or motors for ventilation purposes, although it is possible to utilize up to five baking chambers 2, as illustrated in these exemplary embodiments. Furthermore, in addition to a very high baking quality, the wood-burning oven 1 makes it possible to reduce the heating-up time by approximately 50% in relation to conventional systems. Utilizing the embers and waste heat likewise makes possible a reduction in heating material of over 50%.

It is generally the case that all the baking-chamber flaps 8 and all the flue-gas-duct flaps 8' will be closed during the baking operation. In special cases, however, depending on the articles which are to be baked, it is also possible for individual baking chambers 2 to be fired separately in the conventional manner or else to be provided in addition without flue-gas-duct flaps.

What is claimed is:

1. A wood-burning oven comprising:
   (a) a combustion region;
   (b) a plurality of baking chambers arranged one above the other, and positioned above said combustion region; each of said baking chambers comprising pivotable baking-chamber flaps located on both sides of said baking chambers, enabling closing off each of said baking chambers from flue gases; and
   (c) multiple pivotable flue-gas-duct flaps on two side walls of said oven, said flue-gas-duct flaps being positioned alternately between said two side walls, and located between two adjacent said baking chambers, thereby forming a meandering flue-gas guidance along said baking chambers from one side to another side of said two side walls when said baking-chamber flaps and said flue-gas-duct flaps are closed.

2. The wood-burning oven according to claim 1, wherein at least one fireclay brick is arranged above said combustion region.

3. The wood-burning oven according to claim 1, wherein an ash chamber, a grate and a firing carriage are provided in said combustion region.

4. The wood-burning oven according to claim 3, wherein the firing carriage is designed such that it can be pulled out.

5. The wood-burning oven according to claim 1, wherein stone tiles are provided for floors of said baking chambers.

6. The wood-burning oven according to claim 1, wherein said combustion chamber which is not closed off in relation to said baking chambers is provided, with the result that flue gases pass to the sides of the combustion region in each case, along said at least one fireclay brick, to said baking chamber.

7. The wood-burning oven according to claim 1, wherein a flue-gas discharge is provided above said baking chambers.

8. The wood-burning oven according to claim 7, wherein a steaming arrangement is provided above said baking chambers and beneath said flue-gas discharge.

9. The wood-burning oven according to claim 8, wherein steam-feeding pipes to said baking chambers are provided.

10. The wood-burning oven according to claim 1, wherein said side walls, a floor and covering form a continuous metal structure.

11. The wood-burning oven according to claim 1 further comprising lever elements on a front side of said oven for operating said baking-chamber flaps and said flue-gas-duct flaps.

* * * * *